Feb. 2, 1960
J. H. BORNZIN
2,923,230
KNIFE GUIDED PLUNGER FOR HAY BALERS
Filed June 5, 1957
4 Sheets-Sheet 1
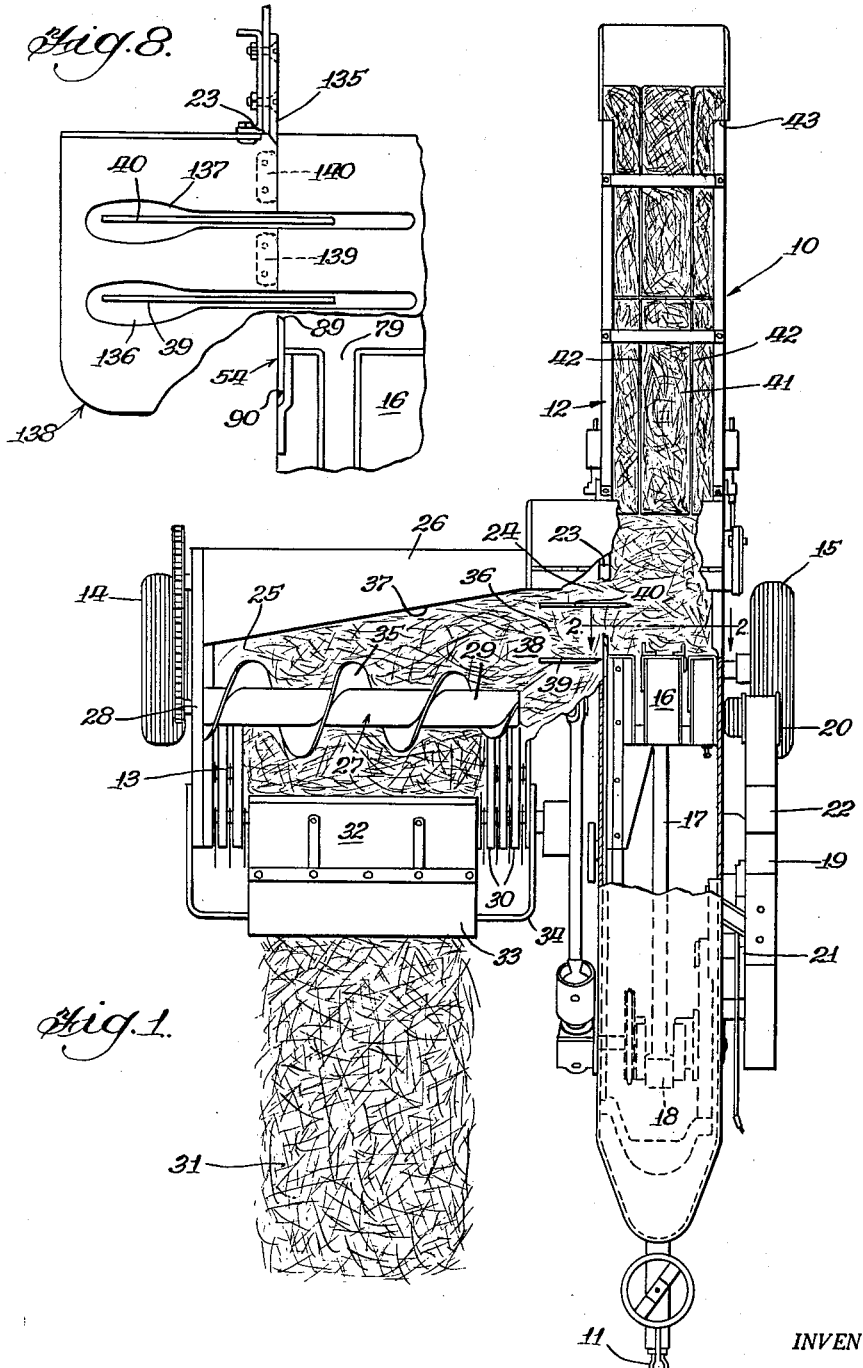
INVENTOR.
James H. Bornzin
BY Paul O. Pippel
Atty.

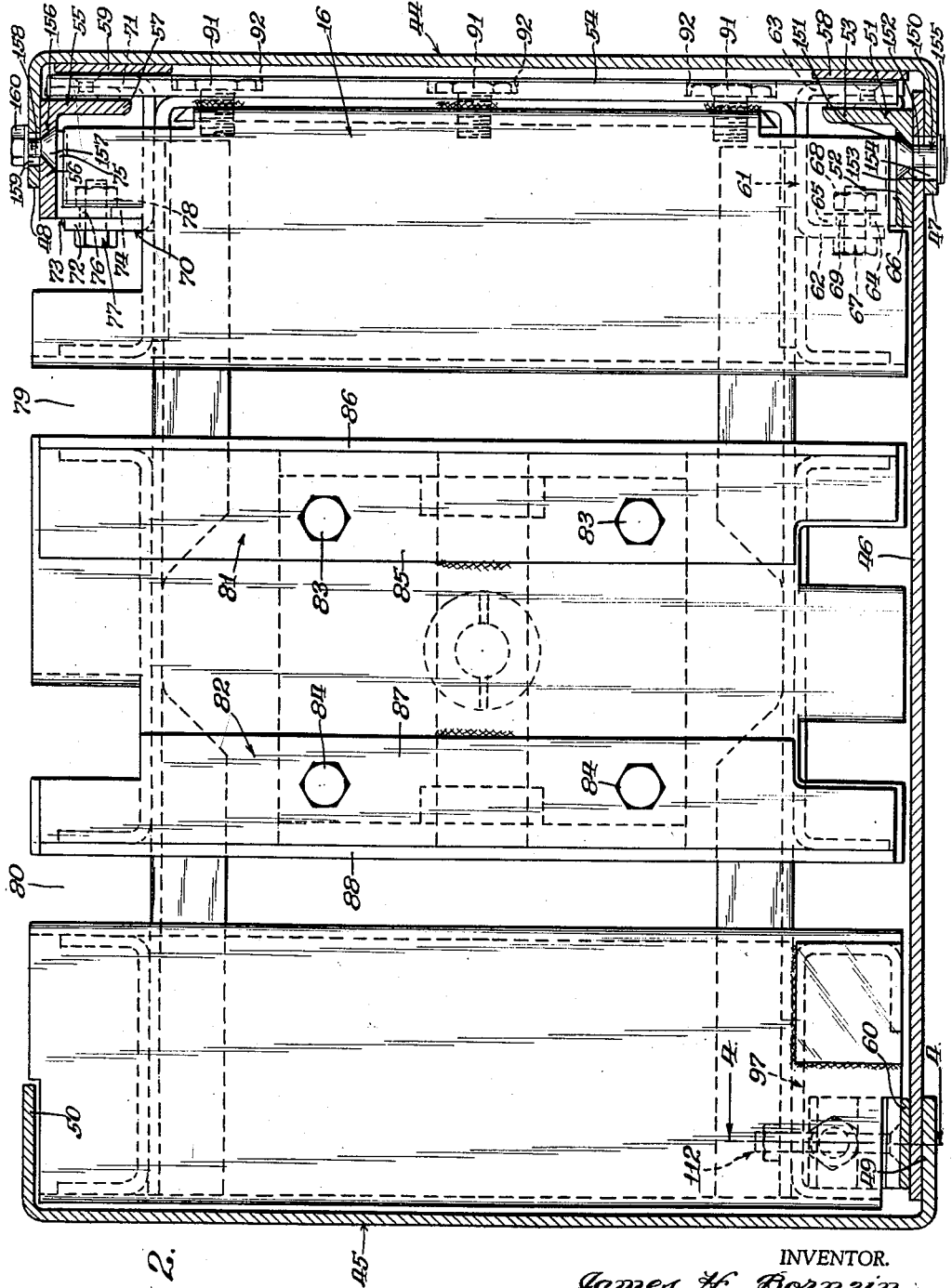

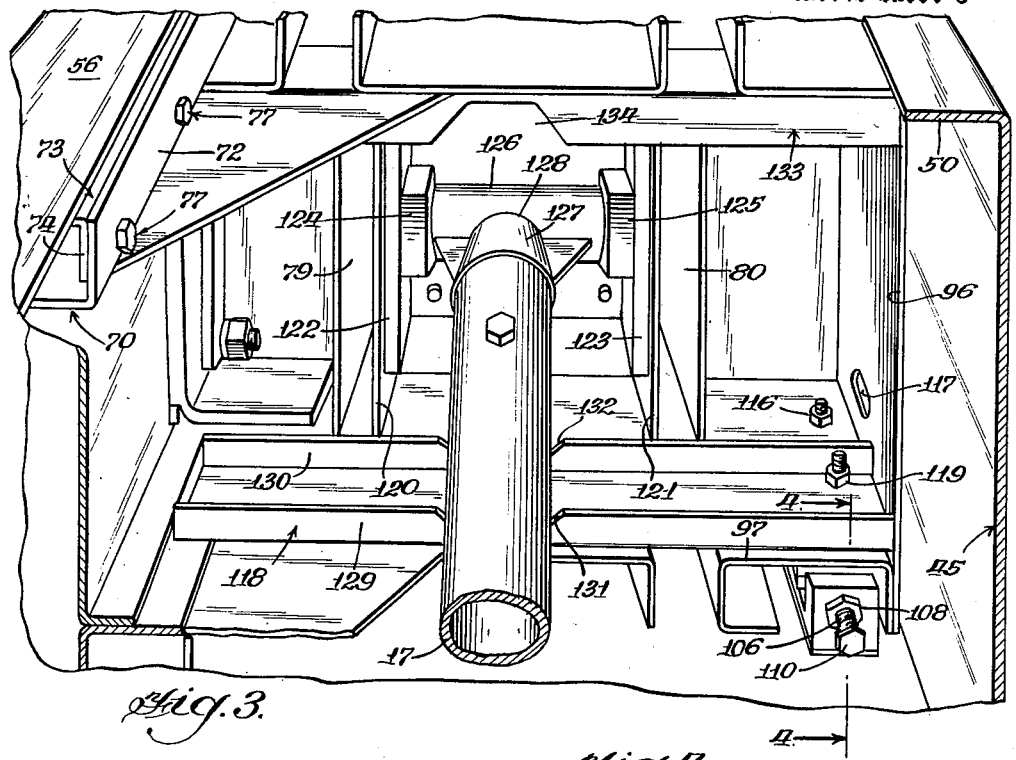

INVENTOR.
James H. Bornzin
BY Paul O. Pippel
Atty.

United States Patent Office 2,923,230
Patented Feb. 2, 1960

2,923,230

KNIFE GUIDED PLUNGER FOR HAY BALERS

James H. Bornzin, La Grange, Ill., assignor to International Harvester Company, Chicago, Ill., a corporation of New Jersey Application June 5, 1957, Serial No. 663,628

8 Claims. (Cl. 100—98)

This invention relates to a new and improved knife guided plunger for hay balers.

Balers and more particularly hay balers employ reciprocating plungers to cause a compacting of the hay and when the plunger is equipped with a knife, the material being baled is sheared by movement of this knife as it passes a stationary ledger plate. The compressing and shearing of hay within the forming chamber imposes great stresses and strains on the forming chamber as well as on the reciprocating plunger. These stresses and strains result in wear of the surfaces upon which the plunger rides. In addition, the shearing action upon the material tends to force the cutting edges of the knife apart from each other. This increases horsepower requirements, results in poor appearing bales because the hay is not sheared cleanly and increases wear of the opposing slide surfaces.

It is thus a prinicpal object of the present invention to provide a reciprocating plunger for hay balers having a knife along one edge thereof to cause a complete separation of each charge of hay and a cooperating bale forming chamber in which track means is provided for the knife resulting in a knife guided plunger within the bale forming chamber.

An important object of this invention is the provision of a knife guide for plungers in a bale forming chamber wherein the knife is guided and maintained in an adjacent position to the stationary ledger plate.

Another important object of this invention is to equip a bale forming chamber in a baling machine with reinforced tracks along one side thereof to receive cooperative means formed on a sheet metal fabricated reciprocating plunger.

Another important object of this invention is to supply a fabricated baling plunger for cooperation with a fabricated bale forming chamber and having cooperative track means for inter-engagement with each other whereupon the fabricated plunger is guided throughout its full reciprocable movement within the bale forming chamber.

Still another and important object of this invention is to provide a hay baler with a reciprocating plunger of the type having a knife thereon to separate charges of hay as they are fed to a bale forming chamber and means for guiding the knife within cooperative track members in the plunger and the bale forming chamber to thereby guide the knife for continuously close shearing contact with a stationary shear blade in the bale forming chamber.

Other and further important objects and advantages will become apparent from the disclosures in the following specification and accompanying drawings:

In the drawings:

Figure 1 is a top plan view of a hay baler incorporating the principles of this invention;

Figure 2 is a sectional view taken on the line 2-2 through the bale forming chamber of the baler as shown in Figure 1;

Figure 3 is a perspective view looking into the forward end of the bale forming chamber behind the compressing plunger;

Figure 4 is a sectional view taken on the line 4-4 of Figure 3;

Figure 5 is a sectional view taken on the line 5-5 of Figure 4;

Figure 8 is a top plan view of a portion of the hay baler of this invention and having parts thereof broken away to show the interior thereof.

Figure 6:
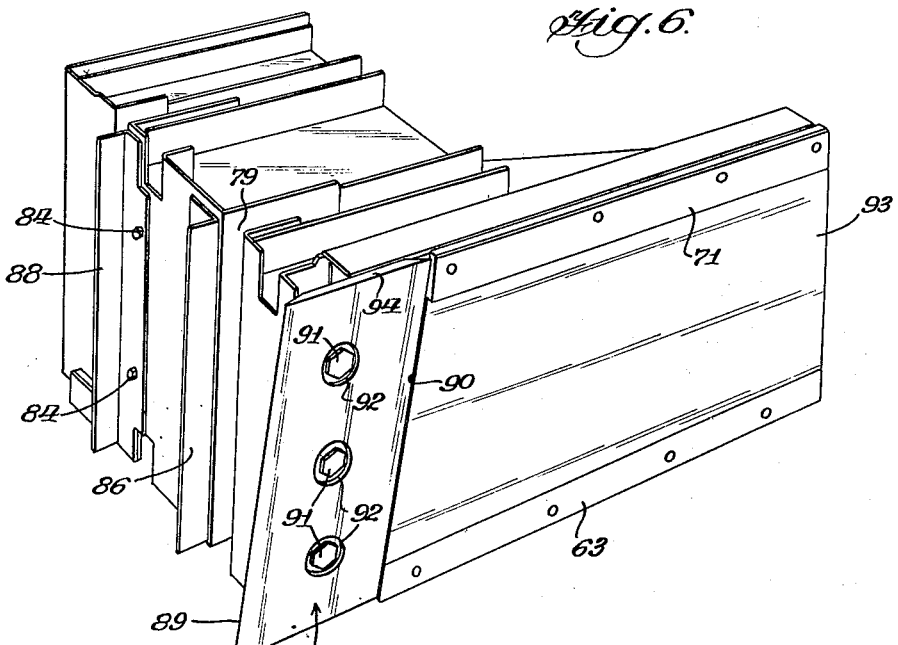
Figure 6 is a perspective view of the plunger of this hay baler.

As shown in the drawings, the reference numeral 10 indicates generally a hay baler having a hitch mechanism 11 at the forward end thereof for attachment to the draw bar of a pulling tractor (not shown). The baler 10 includes generally a longitudinally extending bale forming chamber 12 and a laterally extending platform 13 which is adapted to pick up hay from a windrower, or the like, and deliver it into the bale forming chamber 12. The baler 10 is carried on spaced apart ground-engaging wheels 14 and 15 and as the pulling tractor pulls on the hitch mechanism 11 the wheels 14 and 15 ride the ground for easy traversing of the implement through a field having hay to be baled. The bale forming chamber has a plunger 16 which is reciprocally driven therein by a pitman 17 and a crank 18 which receives its rotational drive from an engine (not shown) through the medium of a relatively wide flat belt 19. A pulley 20 carries the upper forward end of the flat belt 19. An idler pulley 22 is adapted to impart tension to the belt 19 to supply rotative drive to the crank 18 which, in turn, effects fore and aft reciprocation of the bale compressing plunger 16. The plunger 16 is adapted to move from its position as shown in Figure 1 to a position wherein the forward end thereof has passed the rearward edge 23 of a vertical side opening 24 in the bale forming chamber 10 adjacent the platform 13.

The platform 13 has a deck portion 25 and a back wall 26 of gradually decreasing width from the outer end thereof to a position adjacent the side opening 24 in the bale forming chamber 12. A transversely disposed auger conveyor 27 is generally mounted at its outer end in an end wall 28, whereas the inner end 29 of the auger is free and unjournalled to permit the passage of hay therethrough without entanglement. A pick-up cylinder 30 is adapted to lift hay 31 or other material to be baled from a windrow laid in a field. A hold-down member 32 is pivoted at its forward end 33 on a bail-like bracket member 34. This holddown member 32 is adapted to exert a downward pressure on the hay 31 over the pick-up cylinder 30, whereupon the hay is delivered substantially to the underside of the auger conveyor 27. Although the auger conveyer 27 is disposed at right angles to the longitudinally extending line of draft of the implement the spiral flight 35 thereon causes the hay, now designated by the numeral 36, to move in a generally angular direction coinciding substantially with the angularly disposed front edge 37 of the rear wall 26 of the platform 13.

As the hay is discharged through the unjournalled end 29 of the auger conveyor 27, it is deposited into an area designated as 38. Reciprocating or gyrating packer fingers 39 and 40 are mounted on top of the bale forming chamber 12 by means (not shown) to cause a sweeping of the hay 36 from the area 38 through the side opening 24 and thus into the bale forming chamber whereupon reciprocation of the plunger 16 causes compression of the hay into bale formation, as shown at 41. The baler is equipped to have tie strands 42 encircle the bales 41 in an endwise manner to thereupon hold the hay under compression while it is discharged outwardly from the rearward discharge opening 43 at the end of the bale forming chamber 12. The operation of the feeding of hay from the platform 13 into the bale forming chamber 12 by means of reciprocating fingers 39 and 40 is shown in greater detail in the Crumb et al. Patent 2,450,082.

As stated in the objects above, the purpose of the present application is to set forth the particular fabrication of the compressing plunger and the fabrication of the bale chamber housing 12 through which the plunger reciprocates. More particularly, the inter-engaging mechanisms of the plunger and bale forming chamber are important to cause a guiding of the plunger within the bale forming chamber to facilitate smooth and uninterrupted reciprocation of the plunger. As best shown in Figure 2, the bale forming chamber 12 is composed of spaced apart generally vertically disposed inwardly facing channel members 44 and 45. The plunger 16 is shown within the spaced apart channels 44 and 45. The plunger 16 is shown within the spaced apart channels 44 and 45 and substantially filling the space therebetween. The bale forming chamber 12 further includes a bottom pan, or the like, 46, which extends between the side channels 44 and 45. In order to more completely describe the fabrication of the bale forming chamber, it is necessary to identify the inwardly turned flanges 47 and 48 of the channel member 44 and 49 and 50 of the channel member 45.

The bottom pan or base plate 46 spans the inwardly turned ledges 47 and 49 of the respective inwardly facing channel members 44 and 45. An angle member 51 is affixed to the pan or plate 46 at a position over and above the inwardly turned flange 47. The angle member 51 runs lengthwise in the same manner as the flange 47 and is equipped with a generally horizontal member 52 upon which the plunger member 16 rides for longitudinal sliding movement and a vertical member 53 against which the knife element 54 which is integral with the plunger rides for vertical guiding of the knife and plunger to maintain shearing position with a stationary ledger plate 135 bolted or otherwise fastened to the rearward edge 23 of the opening 24 in the bale forming chamber. The angle member 51 is adjustably fastened to the baling chamber bottom plate 46 and the inwardly turned flange 47 of the side 44 by a bolt 150. The bolt 150 has a head 151 which is countersunk in the horizontal member 52 of the angle 51 and a shank 152 which passes through elongated slots 153 and 154 in the plate 46 and flange 47 respectively. A nut 155 holds the assembled parts together. By such construction the angle member 51 may be adjusted toward or away from the side wall 44 and thus insure a close tracking guide for the intermediate cooperative member on the reciprocable plunger. As best shown in Fig. 8, the guiding of the knife 54 and the plunger 16 is important to the continued proper relationship of the knife 54 with the stationary shear blade 135. The packing fingers 39 and 40 are moved through slots 136 and 137 in a cover or top member 138 disposed over the chamber opening 24 to thus aid in guiding material to the bale forming chamber. Blocks 139 and 140 mounted on the underside of the cover 138 act to further guide the reciprocating blade 54 to shearing relation with the stationary shear blade 135. A similar angle member 55 also runs lengthwise of the bale forming chamber and is mounted on the underside of the top flange 48 of the channel member 44. The angle member 55 has a generally horizontally disposed portion 56 and a vertically disposed portion 57. The upper surface of the plunger 16 rides beneath the horizontal portion 56 and the knife element 54 constituting a part of the plunger has its inner surface slidable against the vertical portion 57. The angle member 55 is adjustably fastened to the baling chamber inwardly turned top flange 48 of the side wall 44 by means of a bolt 156. The bolt 156 has a head 157 countersunk in the horizontal member 56 of the angle member 55 and a shank 158 which passes through an elongated slot 159 in the flange 48. A nut 160 engages the threaded shank 158 to hold the assembled parts in adjusted relationship. As in the case of the angle member 51 the angle 55 may thus be laterally adjusted as desired with respect to the side wall 44 for close guiding of the plunger movable reciprocally in the bale forming chamber. The channel member 44 is further equipped with longitudinally extending pads or strip members 58 and 59. The strip member 58 is located adjacent the lower portion of the bale forming chamber and forms a guide wall spaced from the vertical wall 53 of the angle member 51. Thus the outer surface of the knife element 54 is slidable against the pad or strip 58 and is thus confined between the spaced members 53 and 58. Similarly the outer surface of the knife element 54 at the upper edge thereof rides against the pad or strip 59 and the knife 54 is held between the spaced members 57 and 59 at the top thereof. Thus the knife 54 which is an integral part of the plunger 16 is securely guided in proper shearing relationship with the blade 135 and the plunger is guided for centered movement within the bale forming chamber 12 by reason of cooperative track-like means just described. The track elements on the bale forming chamber are the angle members 51 and 55 cooperating with the spaced pad or strip members 58 and 59 and adapted to receive the track engaging means in the form of a knife blade 54 for slidable riding therewithin. Another pad or strip member 60 is mounted on the bottom plate 46 over the flange 49 of the channel member 45. This provides a riding surface for the opposite side of the plunger spaced from the plunger knife means whereby the plunger 16 is held for slidable guiding at three points, namely the angle members 51 and 55 on the knife side of the plunger and the pad or strip member 60 on the far side of the plunger.

The plunger 16 includes in its fabricated structure a channel member 61 which is downwardly opening with side walls 62 and 63. The wall 63 of the channel 61 is in alignment with the knife element 54 of the plunger 16 and, as shown in Figure 6, the downwardly turned flange 63 is positioned behind the forwardly positioned knife element 54. The inwardly spaced flange or vertical wall 62 of the channel 61 is employed to support a guide or bearing angle 64. The angle 64 includes a generally vertically disposed flange or side wall 65 which abuts the inner surface of the vertical wall 62 of the channel 61. A generally horizontally disposed flange or wall 66 of the angle member 64 is adapted to ride on and form the bearing engaging surface for the plunger against the top surface of the flange 52 of the angle member 51 which forms a part of the bale forming chamber 12. A bolt member 67 is adapted to pass through apertures in the abutting flanges 62 and 65 and with the aid of a holding or locking nut 68 the assembly is held securely together. The aperture within the flange 65 is elongated as shown at 69 whereby the flange 65 of the angle member 64 may have adjustable vertical positioning with respect to the channel member 61 whereby the bearing or track engaging surface 66 may be moved upwardly or downwardly to square off the plunger 16 within the bale forming chamber 12.

A similar structure is shown at the upper side of the assembly wherein the plunger 16 includes in its fabrication a channel member 70 having generally vertically disposed side walls 71 and 62. The wall 61 as shown in Figure 6 lies parallel to the flange 63 of the lower member 61 and in the same plane therewith. A still further similarity is the location of the flange 71 on the plunger rearwardly of the knife element 54 and directly therebehind. An angle member or rail 73 is disposed generally within the upwardly opening channel 70 so that a vertical wall thereof 74 abuts the vertical wall 72 of the channel 70. A flange 75 of the angle member 73 is disposed at right angles to the vertical member 74 and thus is horizontally disposed immediately beneath the flange 56 of the stationary angle 55 forming a part of the bale forming chamber. It is this horizontally disposed flange 75 which constitutes the top rail member of the plunger 16 which confines and guides the reciprocable sliding movement of the plunger 16 within the bale forming chamber. A vertically elongated opening 76 is provided in the vertically extending flange 74 of the angle member 73. A bolt member 77 passes through an aperture in the vertical flange 72 of the angle 70 and thence through the elongated aperture 76 of the flange 74. A locknut 78 is adapted to be drawn up tightly on the bolt 77 to thereupon hold the abutting flanges 72 and 74 tightly together. It should be obvious that the angle member 73 may be vertically adjusted throughout the extent of the elongated aperture 76 merely by loosening the nut 78 and thereafter drawing it up tightly after the angle member 73 is moved to its desired vertical position. The angle or rail members 64 and 73 may thus be adjusted inwardly or outwardly to cause the plunger 16 to snugly engage the inwardly projecting angle members 51 and 55 of the bale forming chamber 12, as best shown in Fig. 2.

The reciprocating plunger 16 is fabricated to form needle slots 79 and 80 extending vertically thereof and arranged and constructed to permit passage therethrough of strand-carrying needles used in the tying of the compressed bales. Angle members 81 and 82 are fastened by means of cap screws, or the like, 83 and 84, respectively to the front face of the compressing plunger 16 adjacent the respective needle slots 79 and 80. The angle member 81 includes a flange or face thereof 85 lying parallel with and flush to the front face of the plunger. The other flange or wall of the angle member 81 is shown at 86 and lies at right angles to the flange 85 and projects forwardly from the front face of the compressing plunger 16. As best shown in Figures 2 and 6, the wall 86 constitutes a forward continuation of the needle slot 79 on one side thereof. Similarly, the angle member 82 is constructed with a flat flange or face 87 and a forwardly extending flange or face 88. The flange or side 87 abuts and lies flush with the front face of the plunger 16 and is fastened by means of the cap screws 84 to the plunger. The forwardly extending flange 88 constitutes a forward continuation of the needle slot 80 on one side thereof. Thus the flanges 86 and 88 precede the movement of the plunger through the bale forming chamber and tend to cause a crimping of the hay being compressed to enable the easy sliding around of the bale encircling strands.

The knife element 54 is best shown in Figure 6, and is generally rectangular in shape, having knife edges 89 and 90 along the vertical sides thereof. Cap screws 91 are adapted to pass through the knife blade 54 and thence hold the blade to the fabricated portions of the plunger 16. The caps of the screws 91 are positioned within recesses 92 in the surface of the blade member whereupon the side wall is flush without any protruding screws or the like. The purpose of the double edged blade 54 is to enable the user to reverse the blade on the plunger after the one edge 89 is rough and needs sharpening. The blade is then turned around so that the knife edge 90 is projecting forwardly of the plunger. This enables the operator to get double the useful life of the blade 54 before resharpening is necessary. The knife element 54 lies in the plane with the angle flanges 63 and 71 previously described. A sheet metal fill-in 93 is provided between the upper and lower angle flanges and the forwardly disposed knife element 54 so that the side wall of the plunger 16 on the knife side thereof is smooth and practically uninterrupted from the front to the rear thereof.

The maintenance of the knives in shearing relationship and the centering of the plunger 16 within the bale forming chamber 12 is accomplished by the interengagement of the outer ends, namely, the top and bottom 94 and 95 respectively, of the knife element 54 within the spaced stationary guide or track members 57 and 59 at the top and 53 and 58 at the bottom thereof.

Figure 7:
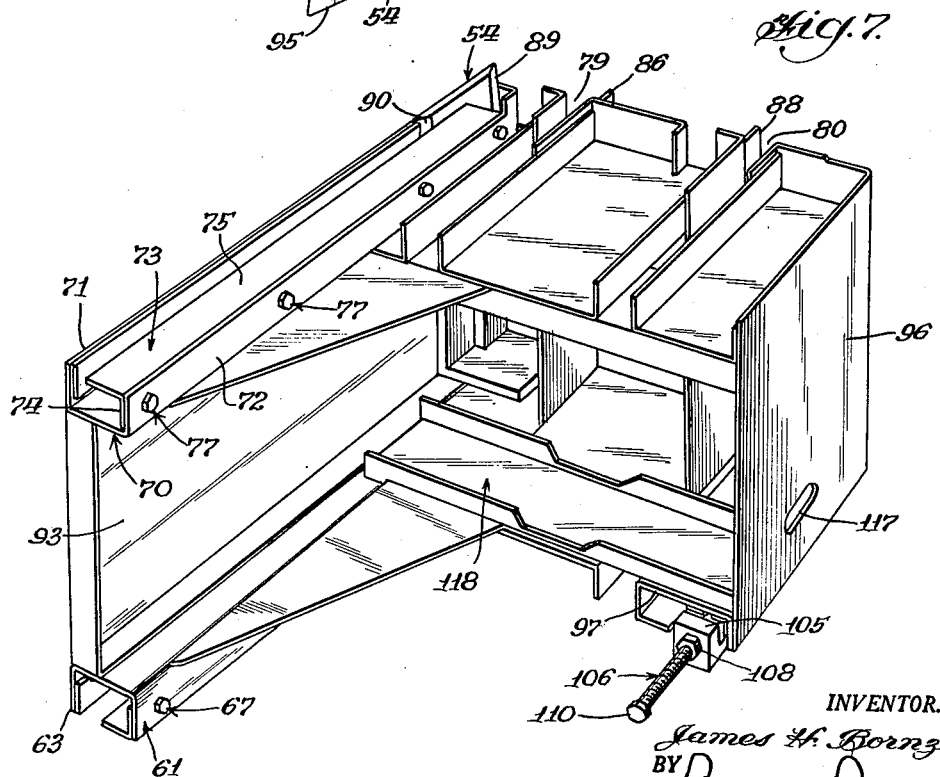
Figure 7 is another perspective view of the plunger, but viewed substantially from the rear thereof.

As best shown in Figure 7, the plunger 16 is equipped with a relatively short side face plate member 96 which lies parallel to the combined knife face 54 and side plate 93 with flanges 63 and 71 on the other side of the plunger 16. This side 96 of the plunger 16 is the side opposite the knife and it is raised or lowered by means of a downward extension for engagement with the riding track 60 to accomplish a cocking of the plunger within the bale forming chamber whereby the knife and its guides will slide easily without binding. In other words, it is this third point of the suspension which levels the plunger or otherwise squares it and the knife 54 within the bale forming chamber to permit easy reciprocable sliding thereof. A channel member 97, as shown in Figures 2, 3 and 7, is adapted to carry an elongated shoe or the like 98 which has sliding contact with the surface of the elongated rail or pad 60. The shoe 98 has a bottom plate 99 in sliding engagement with the rail or pad member 60 as just described. Further, the shoe has an upwardly extending projection substantially the full length of the shoe member 98. A major portion of this projection constitutes a gradual inclined surface 101 which cooperates with a complementary member 102, the under surface of which is correspondingly inclined, as shown at 103. The top side 104 of the member 102 abuts the underside of the inside surface of the channel member 97, as shown in Figure 4. The shoe member 98 also includes an upwardly extending projection 105 spaced laterally from from the lower end of the inclined surface 101. A bolt member 106 is threadely engaged within an openthrough the projection 105 and disposed generally at right angles to the projection so that the inner end 107 abuts the end 108 of the member 102. A locknut 108 is threadedly engaged to the bolt member 106 and when it is desired to hold the screw 106 in fixed position the nut 108 is drawn up tightly against the outer side or end 109 of the projection 105. A head 110 is formed on the screw or bolt 106 and when the nut 108 is withdrawn from its abutting relationship with the wall 109 the head may be turned and a new adjustment for the screw relative to the projection 105 may be conveniently made. The interengagement of the inclined surfaces 101 and 103 act as wedge members to regulate the spacing between the channel member 97 and the rail or pad member 60 which forms part of the bale forming chamber. Thus, the downward extension of the shoe member 98 is controlled by the position of the member 102 along the inclined surface 101. If the member 102 is permitted to move in a rightward direction as viewed in Figure 4, then the lower plate 99 of the shoe 98 may be drawn upwardly toward the channel member 97 and thus reduce the height of the shoe member, which results in a lowering of that side of the plunger within the bale forming chamber. Similarly, if the member 102 is pushed in a leftward direction relative to the shoe member 98, the shoe will be extended downwardly to thus effect a raising of the plunger on that side. Thus it is possible to cause the smooth alignment of the knife element 54 in its respective guide members within the bale forming chamber merely by raising or lowering the shoe member 98 to obtain the proper tilt of the plunger within the bale forming chamber. When the desired setting of the relative wedge lock members 98 and 102 is obtained, then locking screws 111 and 112 are drawn up tightly to hold these members in fixed relationship. The screws 111 and 112 are shown passing through the shoe member 98 with their head members 113 and 114 countersunk or recessed within the bottom plate 99 of the shoe member 98 to thereupon leave a smooth and uninterrupted surface for the shoe member to slide on the pad or rail 60. The shanks of the screws extend upwardly through an elongated aperture 115 in the member 102, as more specifically shown in Figure 5. The screw 111 passes upwardly through the elongated aperture 115 in the member 102 and thence through an aperture in the channel member 97, whereafter a locking nut 116 is threadedly engaged to the shank thereof and drawn up tightly after adjustment is completed. An opening 117 in the side wall 96 of the plunger 16 permits an operator to insert a wrench to engage the nut 116 for either loosening or tightening, as desired. A cross channel member 118 is shown in Figures 3 and 4 and acts as a reinforcement to the fabrication of the plunger 16. The shank of the screw 112 passes upwardly through the elongated aperture 115 in the member 102 and thence through the channel member 97 and the channel member 118, whereupon a locking nut 119 engages the shank and is drawn up tightly against the channel 118 when it is desired to affix the setting of the wedge locking members.

The fabricated plunger 16, as best shown in Figure 3, includes inwardly facing plate members 120 and 121 defining the inner sides of the needle slots 79 and 80. These plates are weldably attached to and form an integral part with the other structural elements of the plunger. Mounted inwardly of these opposing plates 120 and 121 are heavier supporting members 122 and 123, respectively. Each of the supporting members carries a bearing member 124 and 125 respectively to journally receive a cross pin or tube 126. The tube 126 may have oscillating movement about a horizontal axis within the spaced apart vertically disposed bearings 124 and 125. The pitman arm 17, having an end portion 127, is weldably fastened at 128 to the oscillating pin 126. Thus, when the pitman 17 is moved fore and aft by means of the crank 18, the plunger will move reciprocatively within the bale forming chamber 12 to cause a compressing of the hay fed thereto from the pickup. Inasmuch as the pitman arm 17 moves arcuately through a considerable range in its driving of the plunger, the transversely disposed reinforcing channel 118 has its upwardly extending side walls 129 and 130 notched, as shown at 131 and 132, to permit maximum downward swinging of the pitman arm 17. Similarly, a transversely reinforcing channel 133 at the upper side of the plunger has its side walls notched, as shown at 134, to permit maximum upward swinging of the pitman arm 17.

The device of this invention is to provide a fabricated plunger for hay balers, or the like, wherein the knife 54 and plunger are positively guided for proper hay shearing action and centered movement respectively throughout their reciprocation within a bale forming chamber. The fabricated plunger of this invention is provided with a three-point tracking within the bale forming chamber wherein the material shearing knife 54 acts as a guide within the forming chamber. A third point of suspension is the track or pad member 60 at the bottom of the forming chamber opposite the knife side of the plunger and having vertically adjustable shoe means for contacting the track 60. Thus, the knife 54 and plunger 16 are guided by the top and the bottom of the knife element 54 and the integral units may be raised or lowered on the opposite side thereof to effect smooth and uninterrupted movement of the knife through the track elements on the bale forming chamber to thus insure proper crop shearing action by the knives 54 and 135 and to prevent binding during reciprocating movement of the plunger.

Numerous details of construction may be varied throughout a wide range without departing from the principles disclosed herein and I, therefore, do not propose limiting the patent granted hereon otherwise than as necessitated by the appended claims.

What is claimed is:
1. A baler construction including a bale forming chamber, a plunger reciprocable in said bale forming chamber, cooperating elements on said plunger and said bale forming chamber for guiding the reciprocable movement of the plunger in the bale forming chamber, said cooperating elements including spaced apart track means on said bale forming chamber and corresponding spaced apart track engaging means on said plunger, said spaced apart track engaging means vertically spaced apart and disposed in planar alignment on one side of the plunger and bale forming chamber, said track engaging means on the plunger comprising a knife element on one side of said plunger, the vertically spaced apart track means on said bale forming chamber include laterally spaced apart fixed rail members to receive the top and bottom of the knife element respectively for guiding of the plunger within the bale forming chamber.

2. A device as set forth in claim 1 in which said cooperating elements further include a track on the opposite side and bottom of said bale forming chamber and a track engaging shoe on the bottom of said plunger opposite the knife element for sliding engagement with said track.

3. A device as set forth in claim 2 in which the track engaging shoe has adjustable wedge means for vertically adjusting the height thereof.

4. A device as set forth in claim 3 in which the adjustable wedge means includes a first member having the track engaging shoe on the bottom thereof, said first member having a longitudinally extending inclined surface and a longitudinally spaced apart vertical projection, a second member having a longitudinally extending inclined surface and complementing said first member, adjustable set screw means threadedly engaging said vertical projection and lying in a longitudinal direction for abutting relationship on its end thereof with the end of the second member whereby the setting of the adjustable set screw determines the overall height of the first and second members.

5. A device as set forth in claim 4 in which vertical screw means are passed through the first member and an elongated slot in said second member for locking the first and second members in their longitudinally adjusted position.

6. A device as set forth in claim 1 in which top and bottom relative sliding members are provided between the plunger and the bale forming chamber adjacent the laterally spaced apart fixed rail members.

7. A device as set forth in claim 6 in which the top and bottom sliding members on the plunger are vertically adjustable.

8. A baler construction including a bale forming chamber, a plunger reciprocable in said bale forming chamber, a knife mounted on a side of and forming an integral part of said plunger, a stationary ledger plate fastened to said bale forming chamber in a position to have said knife move therepast to shear a charge of material fed to said bale forming chamber, spaced-apart knife engaging track means mounted on said bale forming chamber, each of said track means having transversely spaced members extending longitudinally of said bale forming chamber, said knife having end portions slidably engaging within said transversely spaced members of said spaced-apart track means, whereby said knife is positively guided against relative movement either toward or away from said ledger plate in its movement past said ledger plate to effectively shear each charge of material fed to said bale forming chamber.

References Cited in the file of this patent
UNITED STATES PATENTS 2,293,679    Barker               Aug. 18, 1942
2,720,160    Tice                 Oct. 11, 1955